United States Patent [19]

Weisigk et al.

[11] 4,088,841
[45] May 9, 1978

[54] TELECOMMUNICATION SYSTEMS WITH CAPTIVE CONDITION SURVEILLANCE AND RELEASE

[75] Inventors: Günther Weisigk, Birmensdorf; Eugen Rippstein, Aesch; Eugen Musterle, Zumikon, all of Switzerland

[73] Assignee: Siemens-Albis Aktiengesellschaft, Zurich, Switzerland

[21] Appl. No.: 720,933

[22] Filed: Sep. 7, 1976

[30] Foreign Application Priority Data

Sep. 16, 1975 Switzerland .................... 011986/75
Jul. 2, 1976 Germany ......................... 2629852

[51] Int. Cl.[2] .............................................. H04Q 3/28
[52] U.S. Cl. ............................................. 179/18 FG
[58] Field of Search ................................. 179/18 FG Primary Examiner—William C. Cooper
Attorney, Agent, or Firm—Benoit Law Corporation

[57] ABSTRACT

Subscriber stations in a telecommunication system are selectively connected and controlled by an exchange having a central control. The subscriber stations have operating conditions varying from an idle to a start condition and from a captive to the idle condition. Line connection circuits of the subscriber stations issue a signal indicative of a transfer of any subscriber station from the captive to the idle condition. Circuits common to the subscriber stations but separate from the central control monitor the subscriber stations as to the issuance of a signal indicative of a transfer of a subscriber station from the captive to the idle condition. Circuit components common to the subscriber stations and connected to the monitor circuits ascertain the particular subscriber station for which an indicative signal has been issued and carry out a release of the particular captive condition. The monitor circuit preferably monitors the subscriber stations also for a transfer from the idle to the start condition, and the system preferably is capable of issuing a corresponding request for a connection to the central control. The subscriber stations preferably are divided into groups for joint interrogation of transfer conditions, and may be subdivided into subgroups for individual interrogation of transfer conditions among the subscriber stations of a subgroup.

31 Claims, 9 Drawing Figures

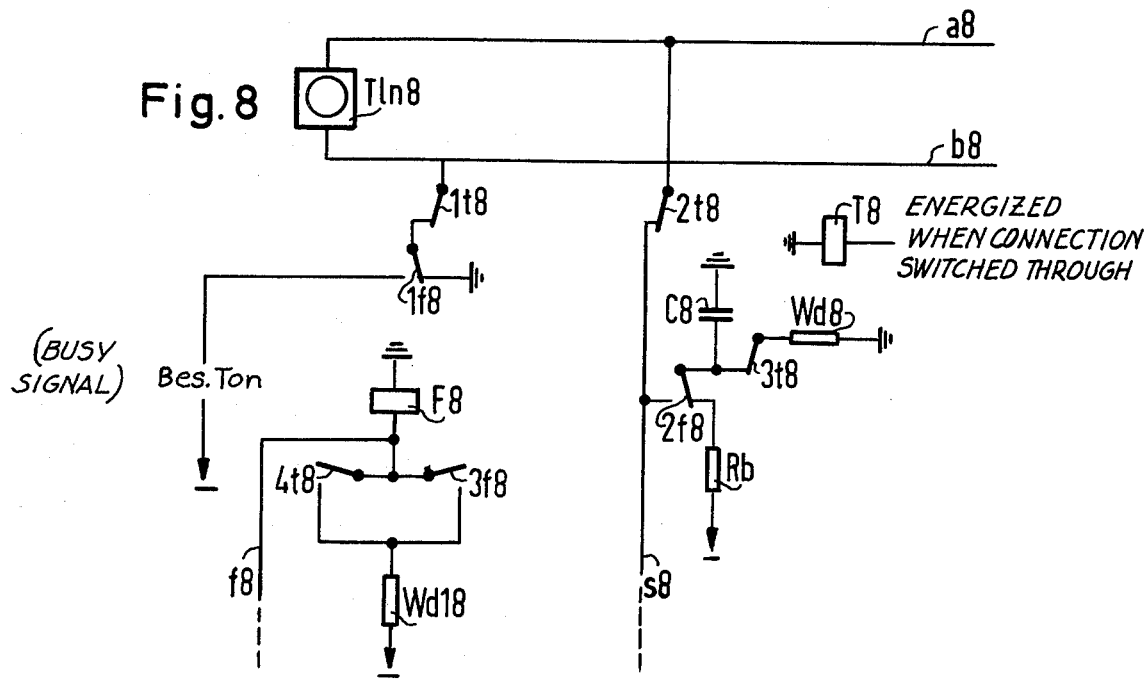
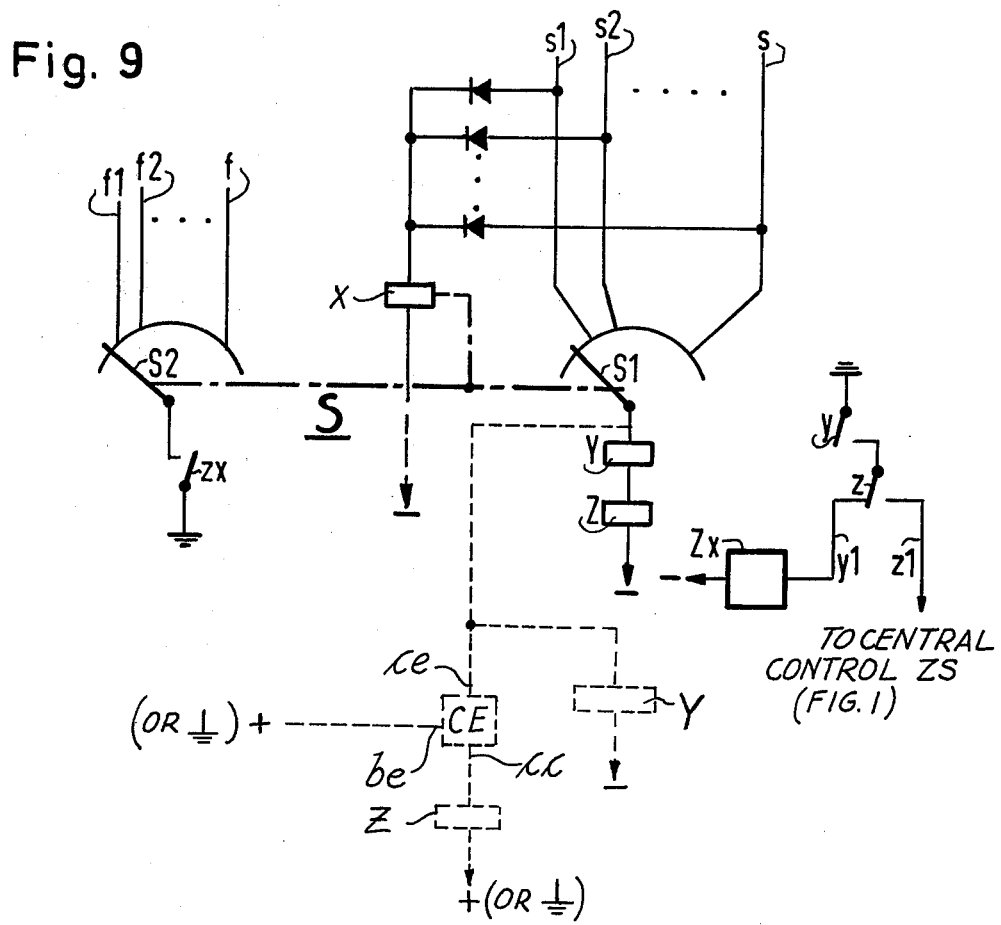

TELECOMMUNICATION SYSTEMS WITH CAPTIVE CONDITION SURVEILLANCE AND RELEASE

BACKGROUND OF THE INVENTION

1. Field of the Invention

The subject invention relates to telecommunication systems, notably telephone exchange systems, wherein subscriber stations are held in, and are released from, a captive condition, such as in instances when the setup of a connection between subscribers is not completed for some reason.

2. Description of the Prior Art

In centrally controlled exchange installations, a line circuit associated with each subscriber station connects the line of the subscriber with the exchange. A subscriber station comprises a subscriber apparatus, subscriber line and line or connecting circuit. In the rest or idle condition of a subscriber station, its handset is hung up and no current flows in the associated loop circuit. If the handset is removed, the subscriber station transfers from the idle to the busy condition and a current flows in a loop circuit extending over the subscriber line. The varying electric potential conditions in the loop circuit have to be ascertained and transferred to the central control as a subscriber start indication, frequently referred to as "call", so that the central control can initiate the control operations necessary for the establishment of the desired connection, such as, among other things, the through-switching of a connection via the switching network to free or idle selector equipment.

A switching arrangement of the above mentioned type is known from the publication "Informationen Fernsprech-Vermittlungstechnik" [literally: "Information on Telephone Exchange Technology"], Issue 1, 1966, pages 3 et seq., published by Siemens & Halske AG, Berlin and Munich, and containing the article by Andreas Friese and Walter Strobelt entitled "Zentralisierte Programmsteuerung in Nebenstellanlagen ESK 400 E nach dem Siemens-Crosspoint-System" [literally: "Centralized Program Control in Private Branch Exchanges Type ESK 400 E According to the Crosspoint System of Siemens"]

In such a switching arrangement, subscriber stations may be monitored with respect to their conditions of operation without need for a provision for each subscriber station, such as in each line circuit, of switching means, such as line relays, which themselves would monitor, recognize and differentiate between the diverse possible operating conditions of the particular subscriber station or of the particular subscriber line circuit. For this purpose, the closure of the subscriber line loop of the particular subscriber station is communicated to a subscriber station finder or lead finder which pertains to a central control and which comprises the mentioned indicator station, the selector circuit and further switching means as shown in the cited article. The subscriber station or lead finder thus has the task of recognizing the closure of the subscriber loop at one of the subscriber stations and to indicate such closure to the central control. The finder relieves the subscriber line connection circuits of this task, and these circuits, therefore, need not be equipped with circuit components for evaluating operating condition variations of subscriber stations. Closure of the subscriber line loop causes the finder equipment individually to identify the particular subscriber line connection circuit and to issue a corresponding result of the identification to the central control.

The latter effects through-switching of the connection from the particular subscriber line connection circuit via the switching network of the exchange to free or idle selector equipment. Through closure of the subscriber line loop an up-to-then idle subscriber line connection circuit thus transfers to the call condition; through the call condition the station or lead finder is excited; and the central control becomes eventually active after performance of the station finder process.

The German patent specification No. 1 265 222 discloses the captive condition for subscriber line connection circuits. In correspondingly equipped telecommunication exchange installations, a subscriber line connection circuit reaches the captive condition if an existing connection is released from the part of another subscriber station which up to then was connected to the subscriber station of the particular line connection circuit, and if therefore the subscriber loop in that station is not yet opened. Also, a subscriber line connection circuit may reach the captive condition in case of premature release of a connection being in the establishment process, as well as in case of erroneous dialling, excessive delays between dial actuations or in case of a busy condition of the called subscriber.

The circuit components arranging the captive condition in the line circuit ascertain that the setup of a connection from or to the particular subscriber station is only then again possible, when the subscriber has hung up his handset. In this manner, the exchange is enabled to clear equipment and lines without the subscriber having to hang up his handset and without an as such completely unintended renewal call taking place thereby, which would mean a use of the central control in addition to the station finder equipment.

Although the subscriber station is separated from the exchange, the loop circuit is, however, closed, as long as the handset of the subscriber station has not been hung up; the subscriber station then being in effect busy. As soon as the handset is hung up, the subscriber station transfers from the busy to the idle condition. This change in operating states of the subscriber station also has to be ascertained, so that the conditions applicable to the captive state of operation of the subscriber station may be cancelled.

This is of particular importance in exchanges in which, in connection with a catching circuit in the subscriber station, further operative features, such as, for instance, the feed-in of a busy signal into a subscriber station "caught" after a release, are provided. The feed-in of a busy signal into a subscriber station in the captive condition enables the particular subscriber to recognize the captive condition immediately and causes him to hang up his handset prior to initiation of a new dialling operation (call, dialling of a number).

The mentioned German patent specification No. 1 265 222 discloses a circuit arrangement wherein the captive condition is monitored by circuit components individually provided in each subscriber line connection circuit. For this purpose, there is provided a relay which is held energized by a holding circuit extending via the particular subscriber line loop and which drops out as soon as in the subscriber station the particular subscriber line loop, and thus the holding circuit of that relay, is opened for the purpose of a release of the subscriber line connection circuit.

SUMMARY OF THE INVENTION

The invention has the object, also in a circuit arrangement of the initially indicated type, to monitor the captive condition of subscriber line circuits without having to provide therefor monitoring or surveillance means for each subscriber line circuit; that is, monitoring means which would have to recognize and evaluate the operating condition of the particular subscriber station independently.

The object or task of the invention is realized or solved in that the ascertainment of the operating condition takes place not only for subscriber stations which transfer from the idle to the start condition, but also for subscriber stations which transfer from the captive to the idle condition, and that for this purpose the subscriber line connection circuits of the subscriber stations issue a start excitation to a lead finder common to the subscriber line connection circuits; through closure of the subscriber line loop at the transition from the idle condition to the call condition, as well as through interruption, at the opening of the subscriber line loop in the captive condition, of a lockout circuit which in the captive condition extends via the subscriber line loop and suppresses a start excitation which in the captive condition has been switched on preparatorily, and that the lead finder in case of ascertainment of a subscriber line connection circuit issuing a start excitation determines from the start excitation received in each case whether the particular subscriber line connection circuit has transferred from the idle condition to the call condition or whether at the particular subscriber line connection circuit the associated subscriber line loop has been opened in the captive condition, and that the lead finder according to said determination causes either the issuance of a signal for a request to the central control for the establishment of a connection between the particular subscriber line connection circuit and a switching apparatus particular to that connection, or the lockout of the captive condition of the particular subscriber line connection circuit.

In centrally controlled systems, the central control executing the establishment of the connection and other operations is seized for every incoming and outgoing connection set up and is thus merely able to control only one connection at a time. In order to reduce the duration of the busy or seized condition of the central control, it is desirable to effect the ascertainment of subscriber stations varying their operating conditions not by means of the central control but rather to ascertain the operating condition of such subscriber stations, the operating condition of which has just then changed itself, by means of a searching or finder apparatus which is jointly provided for a predetermined number of subscriber stations and only then and only for part of the operating cases (subscriber call) to request the central control for further operations. This provides thus the advantage that with regard to the duration of the busy condition of the central control that possible short-term busy conditions or seizings may be kept away from the central control in case of subscriber stations which transfer from the idle to the call condition, and a request to the central is completely omitted in the case of subscriber stations which transfer from the captive to the idle condition.

According to the invention, lead finder start excitations are generated, on the one hand, at the transition of the subscriber line connection circuit from the idle to the call condition through closure of the subscriber line loop and, on the other hand, at the opening of the subscriber loop in the captive condition through that opening, in that a blocking circuit, which extends via the subscriber line loop and through which a preparatorily switched on start excitation is suppressed in the captive condition, is interrupted in the particular subscriber station when the subscriber line loop is opened.

A particular advantage of the invention results from that fact that at the release of a subscriber line connection circuit being in the captive condition the station or lead finder becomes also active.

By virtue of this feature, subscriber line connection circuits may be designed so that they need not themselves monitor the subscriber line loop in the captive condition, as was, for example, the case with the catching relay of the circuit arrangement according to the German patent specification No. 1 265 222. To the contrary, the captive condition may be stored by means of a holding circuit closable individually within each of the subscriber circuits. The storage switching means, such as relays, which are employed for this purpose need not live up to the frequently rather contrary and therefore difficult line conditions (tolerances of the line resistance, voltage tolerances, external potential influences, subscriber line shunt and the like). The surveillance of the subscriber line loops thus takes place not only with respect to the occurrence of the call condition, but also with respect to the interruption of the subscriber line loop in the captive condition by means of a central apparatus; namely, the lead finder in which the switching means for this surveillance are provided jointly for a larger selection of subscriber connection circuits. These switching means effect the release of a subscriber connection circuit being in the captive condition, when they receive from the latter a search or lead finder excitation through opening of the subscriber line loop in the captive condition and when they have found the particular subscriber connection circuit.

The invention thus comprises with respect to the number of excitation leads per subscriber line connection circuit all possibilities; inter alia there may be provided one single excitation lead or two or several excitation leads per subscriber line connection circuit. There also exist several possibilities for the surveillance of the subscriber loops from the part of the associated subscriber connection circuit and for the issuance of the finder start excitation from the part of these subscriber connection circuits to the station or lead finder. It is possible to utilize in lieu of two kinds of excitation leads, that is two excitation leads per subscriber connection circuit, only one single excitation lead, if for a recognition or detection of the closure of the subscriber line loop in the course of the subscriber call on the one hand, and for a recognition or detection of the opening of the subscriber line loop in the captive condition for the purpose of releasing the subscriber connection circuit on the other hand, the excitation circuit in the operating case of the subscriber call is switched through via the subscriber line loop, and in the operating case of the release from the captive condition is switched through via a resistor, which in the captive condition is short-circuited via the subscriber line loop up to the opening of same.

In a further development of the arrangement according to the invention, there may be provided further switching means which are also controlled by the selector circuit, in order to connect the excitation leads of the first kind or type as well as the excitation leads of the second type of all subscriber station for a surveillance of their electric potential as to each type jointly to the indicator station, and to release the interrogation of the operating condition of the subscriber stations only after ascertainment of an electric potential variation for a detection of the subscriber station causing that potential variation. This results in the advantage that the utilization of the switching means only takes place when a subscriber station varies its operating condition, which has a favorable effect on contact wear, especially in systems equipped with electromechanical switching means.

The invention in that sense thus relates to an arrangement for the ascertainment and control of subscriber stations varying their operating condition among a plurality of subscriber stations in centrally controlled telecommunication and particularly telephone exchange installations, wherein after ascertainment of a subscriber station varying its condition of operation there are effected for that subscriber station control operations depending on the type of transition of operating condition, and wherein there are provided excitation leads which vary an electric potential condition at the transition of the subscriber stations from the idle to the start condition, and wherein there is provided an indicator station for ascertaining the electric potential condition of the excitation leads, and wherein a selector circuit and switching means controlled thereby are present in order to connect excitation leads to the indicator station for an interrogation of the condition of operation of the subscriber stations, and wherein further switching means are provided which after ascertainment of a subscriber station varying its operating condition effect a request to the central control for the particular subscriber station.

Further objects of the invention will become apparent in the further course of this description. By way of example and not by way of limitation, it is also an object of the invention to provide improved telephone exchange and other telecommunication systems which avoid the initially mentioned disadvantages of prior-art systems.

From one aspect thereof, the invention resides in a telecommunication system wherein subscriber stations with line circuits are selectively connected and controlled by an exchange having a central control and have operating conditions varying from an idle to a start condition and from a captive to the idle condition. The invention according to this aspect resides more specifically in the improvement comprising, in combination, means common and connected to the subscriber stations for monitoring the subscriber stations for a transfer from the idle to the start condition and for a transfer from the captive to the idle condition, means for each subscriber station for generating starting signals in response to a variation from an idle to a start condition and in response to a variation from a captive to the idle condition of the particular subscriber station, means connected to the starting signal generating means and to the common monitoring means for starting in response to each starting signal the monitoring of the subscriber stations by the common monitoring means, means common to the subscriber stations and connected to the monitoring means for issuing a request to the central control for the establishment of a connection for a subscriber station for which a transfer from the idle to the start condition has been ascertained, and means common to the subscriber stations and connected to the monitoring means for releasing from the captive condition a subscriber station for which a transfer from the captive to the idle condition has been ascertained.

From another aspect thereof, the subject invention resides in a telecommunication system wherein subscriber stations with line circuits are selectively connected and controlled by an exchange having a central control and have operating conditions varying from an idle to a start condition and from a captive to the idle condition. The invention according to this aspect resides more specifically in the improvement comprising, in combination, means connected to the subscriber stations for issuing a signal for a first type indicative of a transfer of any subscriber station from the idle to the start condition and a signal of a second type indicative of a transfer of any subscriber station from the captive to the idle condition, means connected to the signal issuing means for ascertaining the particular subscriber station for which one of the signals of the first and second types has been issued, means connected to the signal issuing means and to the ascertaining means for starting in response to each signal of a first type and each signal of a second type the ascertaining of the subscriber station, means connected to the ascertaining means for issuing a request to the central control for the establishment of a connection for the ascertained subscriber station in response to a signal of the first type, and means connected to the ascertaining means for carrying out a release of the ascertained subscriber station from the captive condition in response to a signal of the second type.

From another aspect thereof, the invention resides in a telecomminication system wherein subscriber stations with line circuits are selectively connected and controlled by an exchange having a central control and have operating conditions varying from an idle to a start condition and from a captive to the idle condition. This invention according to this aspect resides more specifically in the improvement comprising, in combination, means connected to the subscriber stations for issuing a signal indicative of a transfer of any subscriber station from the captive to the idle condition, means common to the subscriber stations for monitoring the subscriber stations as to the issuance of a signal indicative of a transfer of a subscriber station from the captive to the idle condition, means common to the subscriber stations and connected to the signal issuing means and to the monitoring means for ascertaining the particular subscriber station for which the indicative signal has been issued and for carrying out a release of the particular captive condition and means connected to the signal issuing means for starting in response to the indicative signal the ascertaining means.

From another aspect thereof, the invention resides in a telecommunication system wherein subscriber stations with line circuits are selectively connected and controlled by an exchange having a central control and have operating conditions varying from an idle to a start condition and from a captive to the idle condition. The invention according to this aspect resides more specifically in the improvement comprising, in combination, means for subdividing the subscriber stations into subscriber groups and the subscriber groups into subscriber subgroups, means connected to the line circuit of each subscriber station and including a lead for indicating a subscriber station transition from the captive to the idle condition, means connected to the lead for jointly interrogating the leads of each subscriber group and for individually interrogating the leads of each subscriber subgroup of any subscriber group wherein a transition indication has occured, and means connected to the interrogating means for providing for each subscriber station as to which a transition indication has occurred a cancellation of a captive condition, means for each subscriber station for generating starting signals in response to a variation from an idle to a start condition and in response to a variation from a captive to the idle condition of the particular subscriber station, and means connected to the starting signal generating means for starting in response to each starting signal the interrogating means.

From another aspect thereof, the subject invention resides in a telecommunication system wherein subscriber stations with line circuits are selectively connected and controlled by an exchange having a central control and have operating conditions varying from an idle to a start condition and from a captive to the idle condition. The invention according to this aspect resides more specifically in the improvement comprising, in combination, means for subdividing the subscriber stations into subscriber groups and the subscriber groups into subscriber subgroups, means connected to the line circuit of each subscriber station and including a lead of a first type for indicating a subscriber station transition from the idle to the start condition and a lead of a second type for indicating a subscriber station transition from the captive to the idle condition, means connected to the leads of the first and second types for jointly interrogating the leads of the same type of each subscriber group and for individually interrogating the leads of the same type of each subscriber subgroup of any subscriber group wherein a transition indication has occurred, and means connected to the interrogating means for providing for each subscriber station as to which a transition indication has occurred selectively a request to the central control and a cancellation of a captive condition, respectively, depending on the type of transition indication means for each subscriber station for generating starting signals in response to a variation from an idle to a start condition and in response to a variation from a captive to the idle condition of the particular subscriber station, and means connected to the starting signal generating means for starting in response to each starting signal the interrogating means.

BRIEF DESCRIPTION OF THE DRAWINGS

The invention and its various objects and aspects will become more readily apparent from the following detailed description of preferred embodiments thereof, illustrated by way of example in the accompanying drawings, in which like reference numerals designate like or functionally equivalent parts, and in which:

FIGS. 6, 7 and 8 are circuit diagrams of subscriber line connection circuits with captive condition detection and remedial features in accordance with preferred embodiments of the subject invention; and FIG. 9 is a circuit diagram of a station or line finder system with associated control, in accordance with a preferred embodiment of the subject invention and useful in conjunction with any of the FIGS. 6, 7 and 8, for instance.

DESCRIPTION OF PREFERRED EMBODIMENTS

Figure 1:
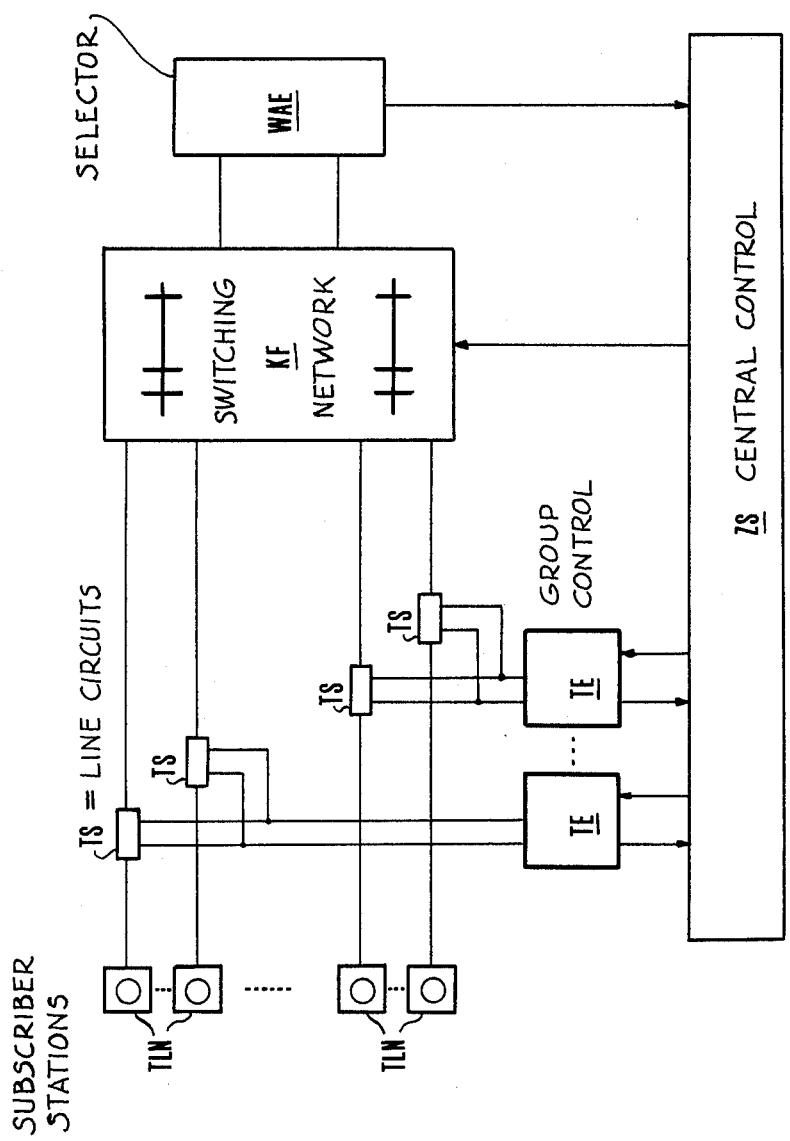
FIG. 1 is a block diagram of an exchange system in accordance with a preferred embodiment of the subject invention.

In FIG. 1 the essential particulars are shown of an exchange system with the equipment according to the invention for ascertaining and controlling subscriber stations varying their states of operation. The subscriber stations TLN are connectible via the associated line circuits TS and a switching network KF to a selector information takeup stage WAE comprising, for instance, a connecting stage and a register. The line circuits TS of a predetermined number of subscriber stations TLN of the exchange system are connected via different leads to the apparatus TE according to the invention serving the ascertainment and control of subscriber stations varying their state of operation, in a form and manner more particularly explained in the further course of this description. In the illustrated block diagram there is indicated that several apparatus TE are conceivable, each of which has a number of subscriber stations of the exchange system associated therewith. The apparatus TE are connected to the central control ZS in order to issue a request to the central control ZS after ascertainment of a subscriber station TLN transferring from the idle to the starting or excitation condition. The central control ZS, in turn, connects the particular subscriber station TLN via the switching network KF through to a selector information takeup stage WAE whereupon the latter emits the proceed-to-dial signal.

Thereupon the particular circuit TE may be separated from the central control ZS so that same becomes available for the processing of a further subscriber station excitation signal. On the basis of the dial or selector information, the through-switching path to the called subscriber TLN is determined in the control ZS and the through-connection is effected. In case the handset is hung up in one of the subscriber stations TLN being then in a captive condition, the apparatus TE according to the invention effects cancellation of the captive condition in the particular subscriber station TLN directly, without use of the central control ZS, as will yet become apparent from the following description.

Figure 2:
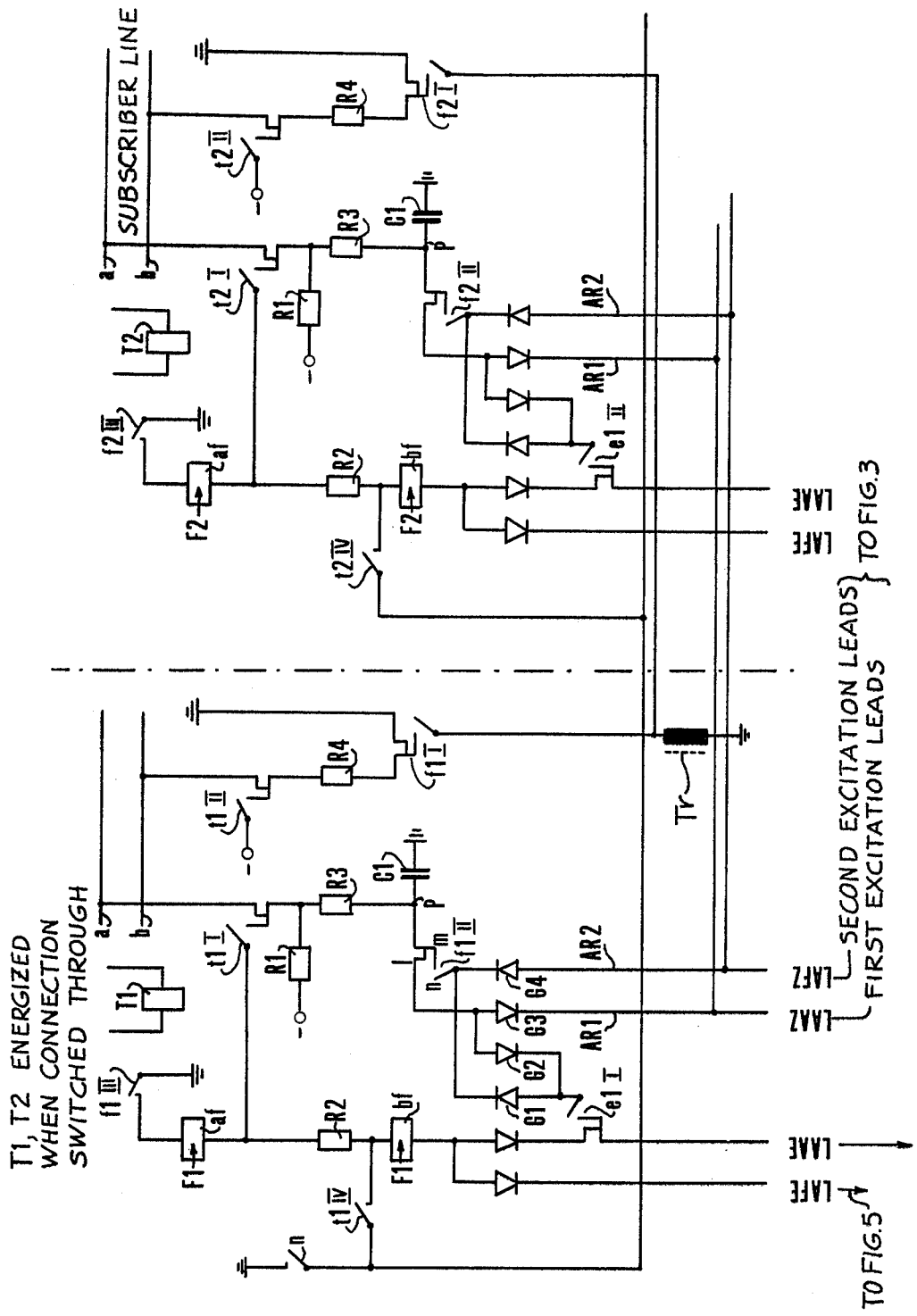
FIG. 2 is a circuit diagram of a detail of the system of FIG. 1, in accordance with a further preferred embodiment of the subject invention.

In FIG. 2 a segment of a subscriber group including several subscriber stations TLN is shown. From this showing, particulars of the line circuit in the subscriber stations or terminals TLN provided in the system according to the invention are seen. The various contacts shown in this and the following figures are designated by low-case letters and display next to an Arabic ordinal number signifying the associated relay a successive contact numbering system using Roman numerals. Each line circuit includes a catching relay F with two windings *af* and *bf*. Further provided is a relay T which is excited during through-switching of the switching elements in the connecting-through switching network of the exchange installation.

The conventional R-relay responsive to variations in the loop condition is herein replaced by two resistors R1 and R4. The loop circuit of a line circuit extends along the following path:

—Negative pole, R1, $t$ I, $a$, $b$, $t$, II, R4, $f$ I, ground (earth)—

Between the speaking wires a and b, the subscriber set associated with the particular subscriber station is connected. A test point or entry P of the loop circuit is derived via a resistor R3 and is grounded (connected to earth) via a capacitor C1. The test point P is connected to a terminal of a contact set $f$ II, which includes positively run contacts and which performs the function of a make-before-break contact. In the further course of this description, such contact sets will only be referred to as contacts, with the position shown in the drawings being designated as rest position. If the relay winding associated with such contact is excited, the contact arrives in its active position, with the contact terminals 1, $m$ which are interconnected in the rest position being only separated from each other or broken when the contact $n$ actuated by the excited relay has been connected to the contact terminal $m$ shown to be of longer size in the drawings. The mentioned contact $f$ II is actuated by the catching relay F. In the rest position of the contact $f$ II, the test point P is connected to an excitation lead of the first type AR1 which includes a diode G3 in forward direction.

In the actuated position of the contact $f$ II, the test point P is connected to an excitation lead of the second type AR2 which includes a reversely connected diode G4. The anode of the diode G3 is connectible to a lead LAAE via a further diode G2 and a contact e (in the illustrated segment the contacts $e$II, $e$III, et seq. for subscriber stations of a subscriber group with the ordinal number 1, for instance). The cathode of the diode G4 is likewise connectible via this contact $f$ II with the lead LAAE, with a diode G1 being connected between the contacts $f$ II and $e$. In the rest position of the contact $e$ the lead LAAE is connected to the winding $bf$ of the catching relay F. By way of the contact $f$ I connected in the loop circuit of each subscriber station, a busy signal may be supplied in the captive condition of the subscriber station. This signal which designates a busy condition may be derived from a busy signal generator, the transformer winding of which is shown in FIG. 2 at T$r$.

The excitation leads of the first type AR1 of subscriber groups including a predetermined number of subscriber stations are combined into leads LAAZ, and the excitation leads of the second type AR2 are combined into leads LAFZ. The diodes shown in FIG. 2 perform merely a decoupling function.

A change of operating condition in a subscriber station TLN effects in the loop circuit of that subscriber station an electric potential variation discernible, for instance, at the test point P. In the idle condition of the subscriber station TLN, an electric potential blocking the diode G3 exists across the resistors R1 and R3. When the handset is removed, the loop circuit is closed and the potential at the anode of the diode G3 becomes more positive, whereby same operates in the forward region. The electric potential variation or change from negative to positive polarity may, therefore, by ascertained via contact $f$ II in rest position on an excitation lead of the first type AR1. Via contact $t$ I and resistor R3 a sufficiently positive potential reaches the test point P in the conversation condition of the subscriber station. The relay T is excited during the connecting-through operation of the switching network participating in the establishment of the connection. Relay T effects the excitation of the catching relay F, and both relays remain excited during the entire duration of the conversation. The energizing circuit of the catching relay F extends from ground via switching contacts $n$ and $t$ IV, as well as the winding $bf$ to a negative potential at a lead LAFE which is connected at the same location as the lead LAAE to the winding $bf$ of the relay F. The catching relay F is held actuated via self-holding contact $f$ III and the lead LAFE.

The relay T separates with its contacts $t$I and $t$ II the speaking or conversation wires $a$, $b$ from the line circuit. The significance of the leads LAFE and LAAE proceeding from each subscriber station will become apparent in the further course of this description.

If an existing connection is released, the relay T in the line circuit of the particular subscriber station returns to its rest position. If at that point of time the handset is hung up, then an electric potential variation is ascertainable in the line circuit at an excitation lead of the second type AR2. After the ascertainment of the subscriber station changing its condition of operation in this manner, as extensively described below, the catching relay F in that subscriber station is locked out and the subscriber station is again in idle condition. If the handset has not yet been replaced or hung up at the point of time of a release of a connection, the catching relay F is continued to be held; that is, the subscriber station is in the captive condition. Upon replacement of the handset the catching relay F is locked out and the subscriber station is again in idle condition.

The subscriber stations shown in FIG. 2 include post-selection safety in the captive condition; that is, that loop potential variations occurring during post-selection at the test point P cannot influence an indicator station connected to the excitation leads AR1 and AR2, respectively.

The capacitor C1 is charged during open loop circuit condition and discharged during closed loop circuit condition. The magnitude of same is selected so that its charge and discharge time constant which becomes effective with the corresponding resistors permits the loop potential variations occurring in the case of a post-selective operation to occur only within an admissible range which does not influence the indicator station. The selection of two resistors R1 and R4 in lieu of the customary line relay permits the achievement of a favorable range of operation reducing the influence of the direct voltage component, which has a favorable effect on the equipment sensitivity at the evaluation of the mentioned potential variations.

Figure 3:
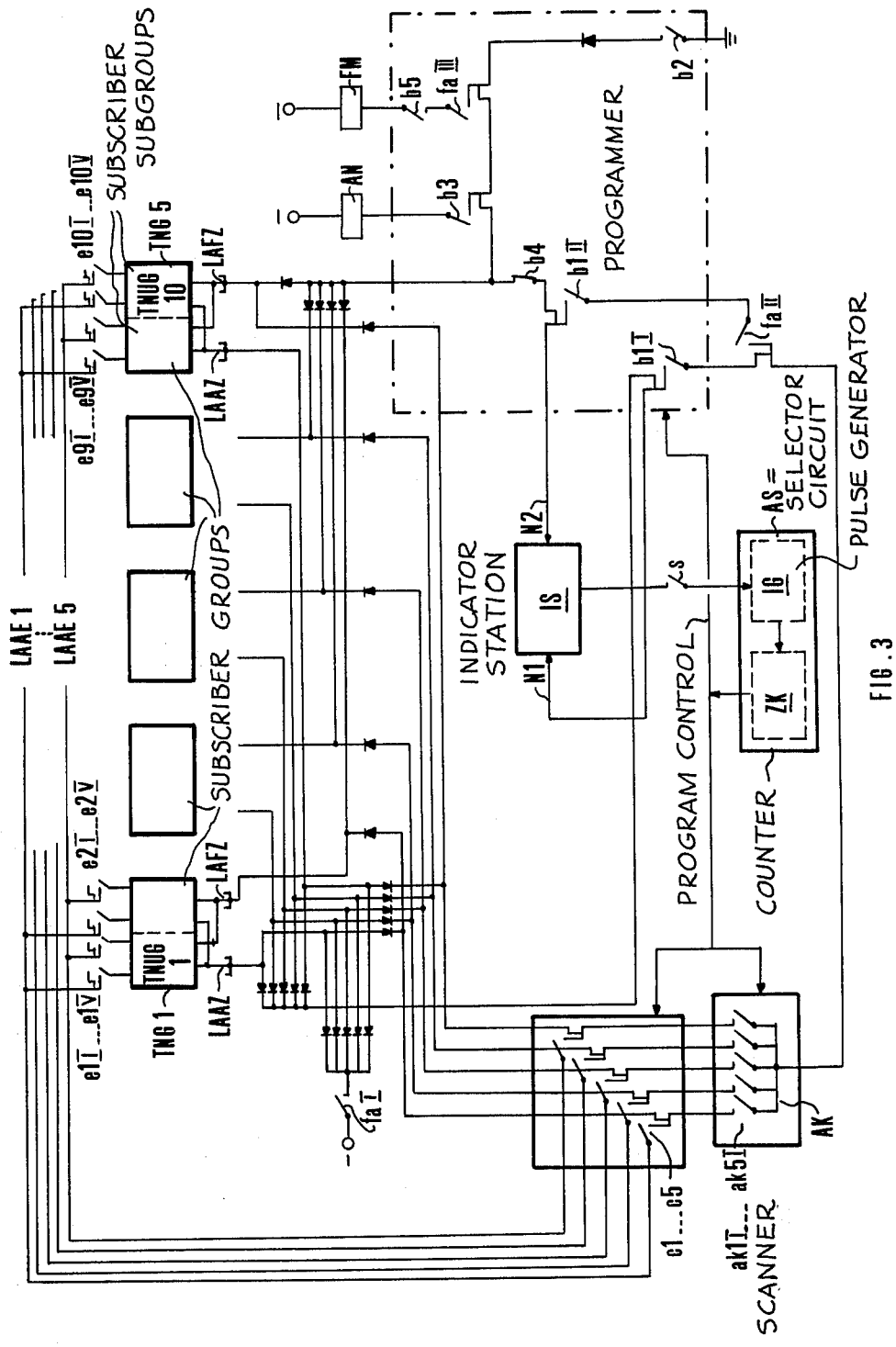
FIG. 3 is a block diagram of a detail of the system of FIG. 1, in accordance with a further preferred embodiment of the subject invention.

The ascertainment of a subscriber station varying its operating condition and further processes connected therewith are explained with reference to FIG. 3. This figure comprises the elements necessary for an understanding of the system according to the invention. The illustrated example relates to a telephone exchange installation or to a part thereof having 50 subscriber stations. The 50 subscriber stations are grouped into 5 subscriber groups TNG each having 10subscriber stations, and each subscriber group TNG is subdivided into 2 subscriber subgroups TNUG each having 5 subscriber stations. The system includes an indicator station IS, a selector circuit AS with pulse generator IG and counter or counting chain ZK, scanner or scanning chain AK and diverse further switching elements as well; reference to these being had in the course of the explanation of the mode of operation of the system. In the illustrated example, the excitation leads of the first type AR1 of 10 subscriber stations of a subscriber group TNG are combined into a lead LAAZ, and the excitation leads of the second type AR2 of 10 subscriber stations of a subscriber group TNG are combined into a lead LAFZ. The five leads LAAZ, in turn, are combined via diodes in forward direction and are connectible to a first input N1 of the indicator station IS via a contact $b1$ I. Also, the leads LAFZ of all subscriber groups TNG are connectible via contacts $b1$ II and $b4$ to a second input N2 of the indicator station IS. The mentioned grouping of subscriber stations TLN into subscriber groups TNG and subscriber subgroups TNUG as such is freely selectible and, in practice, advantageously is effected, amng other things, with a consideration of the constructional parameters of the exchange system. The indicator station IS is able automatically to ascertain electric potential variations occurring at its input N1 and N2. This indicator station is connected via a switching contact $s$ to the pulse generator IG which, in turn, is connected to the counting chain ZK.

Various circuit arrangements exist which satisfy the above mentioned conditions required of the indicator station IS. For instance, switching or switched amplifiers, or operational amplifiers, are known for providing an output signal changing in response to varying input voltages. One such switched amplifier, used under the designation U67-E 800-X1 (M332) is assignee's electronic switching system ESK 8000 for the purpose of subscriber loop surveillance, has an NPN transistor with series-connected base resistors for accepting different input signals (e.g. N1, N2) and for determining the base current. This transistor drives two transistorized booster stages which, in turn, energize a relay to actuate a switch similar to the switch s shown in FIG. 3 in response to input voltage variations.

The counting chain ZK is connected to the scanning chain AK and controls the 5 scanning contacts $ak1$ I . . . $ak5$ I thereof according to a predetermined program. The counting chain ZK, moreover, controls further switching means yet to be mentioned. The scanning contacts $ak1$ I . . . $ak5$ I of the scanning chain AK on the one hand are jointly connected to a contact $fa$ II and, on the other hand, are individually connected to further contacts $c1$ . . . $c5$ and, via the latter and diodes as well, are each connectible with a lead LAAZ and LAFZ, respectively, of a subscriber group TNG. The diodes inserted in the system serve to perform decoupling functions in the various leads. The scanning contacts $ak1$ I . . . $ak5$ I are connected to the contact $b1$ II and $b1$ I, respectively, depending on whether the contact $fa$ II is in its rest or in its active position. The contacts $c1$ . . . $c5$ enable in their active position the connection of the contacts $ak1$ I . . . $ak5$ I to the leads LAAE of the subscriber stations, with the connection of the test point P in the loop circuit of the subscriber stations of a desired subscriber subgroup TNUG proceeding via the contacts $eI$ . . . $eV$ of this subscriber subgroup TNUG.

Figure 4:
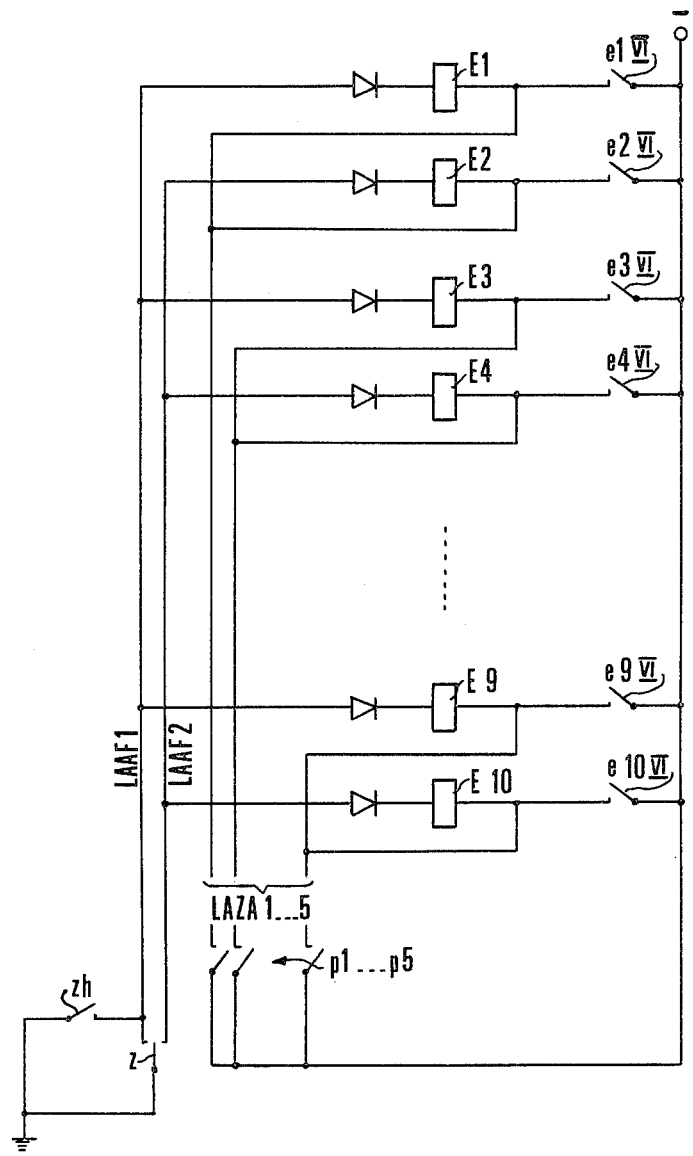
FIG. 4 is a circuit diagram of a further detail of the system of FIG. 1, in accordance with a further preferred embodiment of the subject invention.

FIG. 4 illustrates the equipment provided in the subscriber subgroups TNUG for an actuation of the contacts $eI$ . . . $eV$. For each subscriber subgroup TNUG there is provided an access element E, wherein in the present example the access elements or relays E1 and E2 belong to the subscriber group 1, the access elements E3 and E4 to the subscriber group 2, and so forth.

The access elements E each include a self-holding contact $e1$ VI . . . $e10$ VI, respectively. The acress elements E of the subscriber subgroups TNUG having an odd ordinal number are jointly connected at one side with a first lead LAAF1 which is connectible to ground by a switching contact $z$. Likewise, the access elements E of the subscriber subgroups TNUG having an even ordinal number are on one side jointly connected to a second lead LAAF2 which is also connectible to ground by a switching contact $z$. The access elements E are connected on the other side with leads LAZA1 . . . LAZA5, with the two access elements E of each subscriber group being jointly connected with one of these leads LAZA. The leads LAZA1 . . . LAZA5 are individually connectible to a positive potential via switching contacts $p1$ . . . $p5$. A further switching contact zh serves the purpose during commutation of ground from the lead LAAF1 to the lead LAAF2 to connect the lead LAAF1 to mass for a time until the commutating operation has been terminated, whereby the negative potential for the second access element E of a subscriber group TNG may be connected via the self-holding contact $e$VI of the first access element E of that subscriber group TNG.

In the following description, the manner of operation of the system according to the invention and its effect on subscriber stations varying their condition of operation are explained.

If any one subscriber station changes it condition of operation, then the electric potential conditions change in its loop circuit in the described manner and the indicator station IS, depending on the type of change of the state of operation, ascertains or detects via its inputs N1 and N2, respectively, a change in potential. With this, the pulse generator IG is released via the switching contact s and generates a series of pulses. These pulses control the counting chain ZK. The counting chain ZK, constituted for instance of several relays, represents a firmly wired program or programme generator, the relay contacts of which are actuated in a sequence enabling the operating cycle described below. At the end of the first pulse from the pulse generator IG, the contact $b4$, closed in the rest condition of the system, is opened via the counting chain ZK. In the rest position of the system, the contacts $b2$ and $fa$ II are in the illustrated rest position and the switching contacts $b2$ and $fa$ I are open. If after the opening of the switching contact $b4$ the subscriber starting or excitation signal disappears in the indicator station IS, then that excitation signal stems from or has originated with a subscriber station having transferred from the captive to the idle condition and is stored by subsequent actuation of the fa-contacts; the other case occurring when a subscriber station has transferred from the idle to the excitation or start condition.

As soon as a change of operating condition has been ascertained and its type determined in the described manner, the switching contact $b2$ is closed.

If the ascertained change of operating condition is attributable to a subscriber station transferring from the idle to the excitation condition, then the contact $b1$ I is placed in its active condition after closure of the switching contact $b2$. The closed switching contact connects the leads LAFZ of all subscriber groups TNG to ground and prevents a possible excitation signal from reaching the indicator station IS via these leads. Via contact $b1$ I in its active position and contact $fa$ II in its rest position, the first input N1 of the indicator station IS is connected to the scanner contacts $ak1$ I ... $ak5$ I. Now the scanner contacts $ak1$ I ... $ak5$ I are sequentially actuated. If in this manner there is switched on the lead LAAZ of that subscriber group TNG to which the calling subscriber station pertains, then the counting chain ZK is stopped. Simultaneously, the lead LAZA (FIG. 4) pertaining to that subscriber group is connected to the negative potential and the first lead LAAF1 is connected to ground. Thereby the first access element E of that subscriber group is excited and held via the corresponding self-holding contact $e$ VI. The access element E actuates the switching contacts $e$ I ... $e$ V of the 5 subscriber stations of the associated subscriber subgroup TNUG.

The scanning chain A$k$ is returned to the rest position (i.e. all contacts $ak1$ I ... $ak5$ I open) and the contacts $c1$ ... $c5$ are placed in the active position; that is, the switching contacts $ak1$ I ... $ak5$ I of the scanning chain AK are now each connected to a lead LAAE of the subscriber stations of the desired subscriber subgroup TNUG. Now the scanning chain AK is again started and the leads LAAE are thereby sequentially connected to the first input N1 of the indicator station IS. If the subscriber station being in the excited condition is not found in that subscriber subgroup TNUG, then the switching contact $z$ is actuated and, as described, the second lead LAAF2 is connected to ground (FIG. 4). Thereby the second access element E of the particular subscriber group TNG is excited and the leads LAAE of the other 5 subscriber stations of that subscriber group TNG is connected on via the corresponding contacts $e$I ... $e$ V. With the actuation of the switching contact $z$, the scanning chain AK reverts again to its rest position and its contacts $ak1$ I ... $ak5$ I are again sequentially actuated. As soon as the lead LAAE of the subscriber station being in the excited condition has been connected to the indicator station IS, the scanning chain AK is stopped via switching contact $s$. Now the operations necessary for a marking of the ascertained subscriber station by the central control may be effected.

These consist essentially of placing the contact $b3$ in the active position and in establishing a connection through the access element AN excited thereby to the central control, in order to enable the feeding of a corresponding request signal to the latter. After execution of the paths' through-connection, all switching means necessary for the ascertainment of subscriber stations changing their operating condition are in the system according to the invention reset by the central control to their starting or initial position shown in FIG. 3, whereby the system is available for the processing of a renewed request by a subscriber station changing its condition of operation.

If the change of operating condition ascertained in the indicator station IS is attributable to a subscriber station transferring after the release of a connection from the captive to the idle condition, then a relay associated with the contacts $fa$ is excited after the opening of the switching contact $b4$ for an ascertainment of that subscriber station. Thereby a voltage is applied via switching contact $fa$ I to the leads LAAZ in order to keep a possible potential variation in these leads away from the indicator station IS. Via contact $fa$ III in its active position a subsequent request of the central control is inhibited. Thereafter the contact $b1$ II is placed in its active position so that the second input N2 of the indicator station IS is now connected via contact $fa$ II to the scanning chain AK.

The ascertainment of the subscriber station which has changed its operating condition proceeds in the manner already described. The F-relays of the subscriber stations being in the conversation condition remain excited via the associated leads LAFE during the entire duration of the conversation condition.

Figure 5:
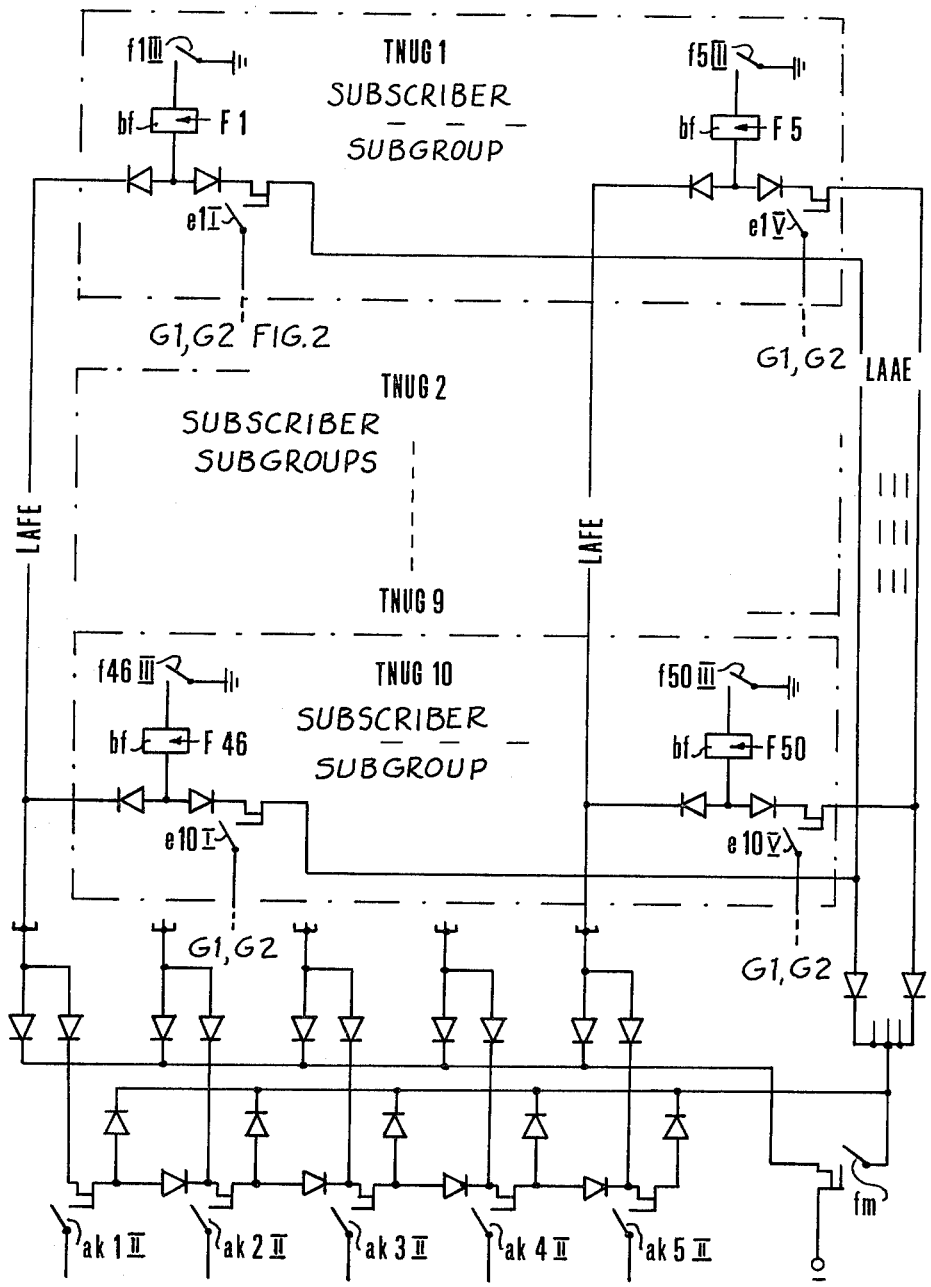
FIG. 5 is a circuit diagram of captive condition lockout equipment in accordance with a preferred embodiment of the subject invention.

The lock-out of the relay F of a subscriber station transferring from the captive to the idle condition will now be explained with the aid of FIG. 5. This figure essentially illustrates the interconnection, via the leads LAFE and LAAE proceeding from each subscriber station, of the 50 subscriber stations on which the illustrated embodiment is based. As soon as a subscriber station which has transferred from the captive to the idle condition has been ascertained, the switching contact $b5$ (FIG. 3) is closed and a negative potential is applied to the leads LAAE of all subscriber stations via the contact $fm$ pertaining to the relay FM, the relays F of the subscriber stations being in the conversation condition are held energized via those leads, with the exception of the relays F of the subscriber stations of those subscriber subgroups TNUG to which the ascertained subscriber station pertains, since the contacts $e$ I ... $e$ V thereof are in the active condition. The relays F of these subscriber stations therefore are separated from the lines LAAE and are held via lines LAFE as well as via the contacts $ak1$ II ... $ak5$ II being in their rest position.

The contacts $ak1$ II ... $ak5$ II operate in parallel to the contacts $ak1$ I ... $ak5$ I; that is, that for instance the contact $ak3$ is actuated simultaneously with the contact $ak3$ II. In consequence, it is only the relay F of that subscriber station which went from the captive to the idle condition which is not held excited, since the associated contact $ak$ 1 II ... $ak5$ II in the active position separates the lead LAFE of that subscriber station from the applied negative potential. The lock-out or positive deenergization of that relay F lets the subscriber station return to the idle condition.

The system according to the invention is also applicable if, contrary to the described example, the condition of operation of the subscriber stations is to be interrogated independently of an ascertained change in potential at the excitation leads of the first or second type. To this end, the additional switching means necessary for the further development described above may essentially be dispensed with; that is, in the embodiment shown in FIG. 3 the contacts $b1$ I, $b1$ II and $b4$ may be eliminated. Likewise, the connections combining the two leads LAAZ and LAFZ, respectively, and extending through contacts $b1$ I and $b1$ II, respectively, are not necessary, so that the two inputs N1, N2 of the indicator station IS are directly connected to the corresponding terminals of the contact $fa$ II.

The selector circuit AS in that case is not triggered or released through a change in potential ascertained in the indicator station IS. The ascertainment of subscriber stations changing their condition of operation takes place through a continuous interrogation of the electric potential condition at the excitation leads of the subscriber stations controlled by the selector circuit AS, with the processes necessary for the switching on or accessing of the excitation leads and for the control of the subscriber stations changing their condition of operation being like the processes described extensively with the aid of FIGS. 3 and 5. The commutation of the ascertainment of subscriber stations transferring from the idle to the excitation or start condition to the ascertainment of subscriber stations transferring from the captive to the idling condition may proceed via the contact fa II correspondingly controlled by the selector circuit AS.

The example detailed for an explanation of the invention comprises a system which is designed for the ascertainment and control of subscriber stations changing their condition of operation among 50 subscriber stations. The grouping set forth in the example of 50 subscriber stations into 5 subscriber groups each having 2 subscriber subgroups at 5 subscriber stations has proved itself in practice in terms of required equipment. In conclusion, however, it must be pointed out that the system according to the invention without difficulties is also applicable with a choice of another grouping of any desired number of subscriber stations.

The manner of grouping of the subscriber stations at a given number of subscriber stations expediently is chosen so that a justifiable effort in terms of required equipment results.

After an embodiment of the invention has been disclosed above in greater detail with the aid of FIGS. 1 to 5, further embodiments of the invention according to FIGS. 6 to 8 will in the following be explained in connection with the station or excitation lead finder shown in FIG. 9.

Figure 6:
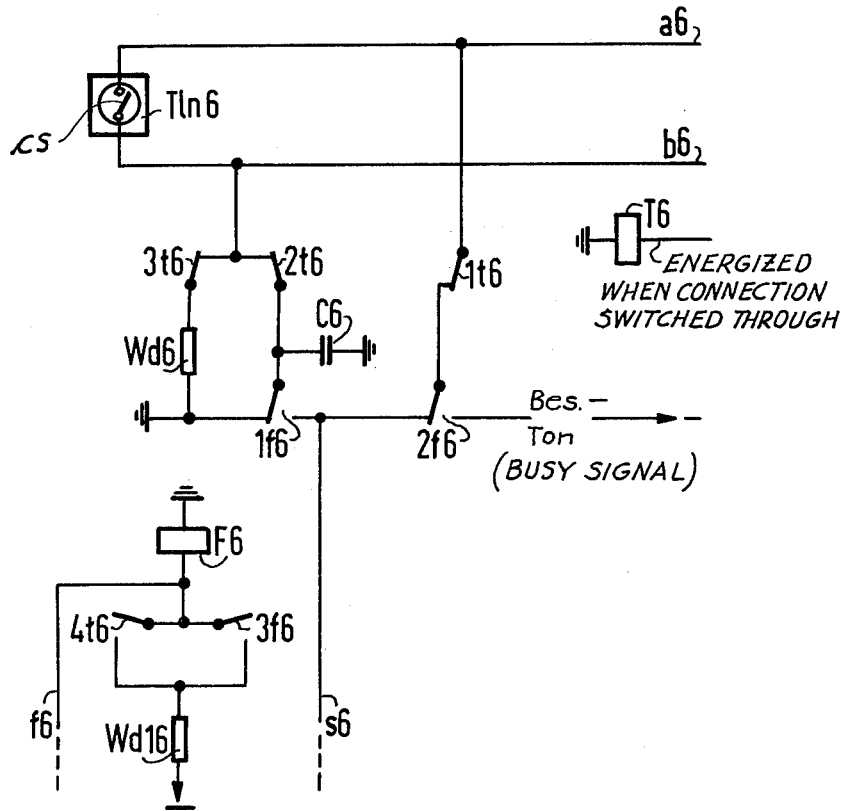

At present, the circuitry of FIG. 6 is described in conjunction with that of FIG. 9.

In FIG. 6, a portion of a subscriber line connection circuit together with a line circuit including two speaking or conversation leads $a6$ and $b6$ and a subscriber station T1$n$6. The subscriber line circuit connects the subscriber station T1$n$6 to the line connection circuit and with a switching network (not shown). Subscriber station, line connection circuit and switching network and provided in the same manner as shown in FIG. 1.

The two speaking or conversation leads $a6$ and $b6$ of the subscriber line circuit are separated in a known manner from each other in the subscriber station T1$n$6 in the rest condition thereof. If a subscriber picks up the handset at this subscriber station, the two leads of the line circuit are interconnected in a known manner. For instance, conventional telephone sets, and also the subscriber sets T1$n$ herein shown and described, have a cradle or hook switch, shown symbolically at $cs$ in FIG. 6, for maintaining the line circuit open, direct-current wise, as long as the handset is on the cradle or hung up, and for closing the line circuit or subscriber loop when the handset is removed from the cradle or hook by the subscriber.

Dialling signals consist then of a number of pulselike interruptions of the subscriber line loop.

When the subscriber line loop is closed in the subscriber station T1$n$6, then the group or earth potential reaches the lead $b6$ from the line connection circuit via the contacts 1$f6$ and 2$t6$ of the subscriber line connection, and proceeds further via subscriber station T1$n$6, lead $a6$ of the subscriber line, and contacts 1$t6$ and 2$f6$ of the line connection circuit to the excitation or starting current path $s6$ individually allocated thereto and leading to the excitation lead finder S in FIG. 9. In FIG. 9 only the excitation current paths $s1$, $s2$ and, in the last position, $s$ are shown. With this starting current (ground or earth potential) the relay X in the lead finder is made to respond. The rectifier elements shown but not individually designated in FIG. 9 and connected to the relay X serve to decouple the starting current paths $s1$ to $s$ from each other.

Response of the relay X in FIG. 9 starts the lead finder apparatus S. A rotary selector, a relay counting chain or an electronically operating selector may be used as excitation lead finder. When the lead finder has reached the excitation current path carrying the excitation potential, then the relays Y and Z respond and issue via signal circuit $z1$ a signal to a central control. Together with this signal, the lead finder S issues to the central control information in a manner not illustrated per se as to which subscriber line connection circuit has been detected during the particular leading finding operation. Selector and line finder equipment which generates a coded signal indicative of the position of the selector arm is well known in the telecommunication art.

The lead finder may be arranged in the same manner as shown in FIG. 1 for the group control (TE). The same applies to the central control (ZS) and switching network (KF). On the basis of the information of the lead finder S about the particular subscriber connection circuit and on the basis of the signal via signal line $z1$, the central control effects in a known manner the connection through the switching network to a free dial pulse acceptance apparatus or selector (WAE). On the basis of this through connection via the switching network, the relay T6 responds in the particular subscriber line connection circuit. Via its contact 4$t6$ the catching relay F6 is made to respond preparatorily. During the conversation, the two conversation leads $a6$ and $b6$ are separated from the line connection circuit by means of the contacts 1$t6$, 2$t6$ and 3$t6$. After the relay T6 has responded, the relays X, Y and Z in the lead finder of FIG. 9 drop.

If the subscriber at the subscriber station T1$n$6 releases the connection, the relay T6, among others, drops in a manner not shown. Thereafter the relay F drops in the subscriber line connection circuit. The line connection circuit now is again in the rest condition.

In practice, the relays T1, T2 . . . T6, T7, T8 . . . T$n$ may be actuated from or via the central control ZS or the switching network KF in a well-known manner.

However, if the connection connected through the switching circuit is released before the subscriber at the station T1$n$6 has hung up his handset, the line connection circuit transfers to the captive condition. In this manner, there is precluded the possibility that the subscriber station T1$n$6 during the time between the release of the connection and the opening of the subscriber line loop is again connected to a free selector circuit (WAE) in the manner described above. In this condition of operation, the relay T6 drops after the release of the connection. The relay F6 is, however, held via its own contact 3$f6$ and the resistor W$d16$. The negative potential connected via the contact 2$f6$ reaches via contacts 2$t6$ and 1$f6$ the excitation current path $s6$ leading to the lead finder S and thereby suppresses at that time a start excitation via the resistor W$d6$ and the contacts 3$t6$, 2$t6$ and 1$f6$ to the excitation current path $s6$. In consequence, no start excitation is effected for the lead finder S at that time.

If the loop of the subscriber line is now interrupted in the subscriber station T1$n$6, then the minus potential which has been connected up to that time via the make side of the contact 2$f6$ is disconnected. The ground or earth potential now reaches the excitation current path $s6$ via resistor W$d6$, contacts 3$t6$ and 2$t6$ and make side of the contact 1/6. The relay X responds in the manner described above.

Through the response of relay X the lead finder S is started and transferred to rest condition via the excitation current path which carries the excitation current as described above. This takes place with the aid of relay Y. Since the resistor W$d$6 is additionally present in the testing circuit of the lead finder S, the relay Z in the lead finder S cannot respond. The resistance value of the resistor W$d$6 is so dimensioned that it amounts to a multiple of the internal resistance of the subscriber line loop. By preventing the relay Z from responding, as mentioned, during this lead finding operation, the issuance of a corresponding signal to the central control via the signal circuit $z$1 is precluded. The central control, therefore, does not in this operating condition effect a through connection between the particular line connection circuit and free selector equipment via the switching network. Based on the fact that only the relay Y, but not the relay Z, responds when the lead finder S returns to the quiescent state, a signal is applied via the signal current circuit $y$1 to a timer Z$x$, which thereupon actuates its contact $zx$ for a predetermined time. In this manner, the catching relay F6 in the particular subscriber line connecting circuit (FIG. 6) is shorted via the switching arm S2 of the lead finder (FIG. 9) and is made to drop. Thereby the relays X and Y in the lead finder S are again locked out. The relays shown in the lead finder S may be executed as electronic switching devices in a manner known per se.

The catching relay F6 in the captive operating condition is thus held via a local holding circuit (via contact 3/6) in the particular line connection circuit. It need not itself monitor the subscriber line loop, and need thus not live up to the frequently rather contrary and therefore difficult line conditions (tolerances of the line resistance, voltage tolerances, external potential influences, subscriber line shunt and the like). The surveillance of the subscriber line loops thus takes place not only with respect to the occurrence of the call condition, but also with respect to the interruption of the subscriber line loop in the captive condition, by means of a central apparatus; namely, the lead finder in which the switching means for this surveillance are provided jointly for a larger selection of subscriber connection circuits. These switching means effect the release of a subscriber connection circuit being in the captive condition, when they receive from the latter a search or lead finder excitation through opening of the subscriber line loop in the captive condition and when they have found the particular subscriber connection circuit.

The capacitor C6 in the subscriber connection circuit according to FIG. 6 serves the purpose of rendering the subscriber connection circuit post-selection proof. This means that in case of interruption of the subscriber line loop in the captive condition, the start or excitation pulse issued to the lead finder S is only effective with a time delay which is larger than the duration of the dialling pulses.

This has the consequence that dialling pulses remain ineffective with respect to the operation described above.

In FIG. 8 a similar circuitry is shown for subscriber line connections as in FIG. 6. If the line connection circuit transfers from the idle condition to the call condition by closure of the subscriber line loop in the subscriber station T1$n$8, then the ground or earth potential reaches via the break side of the contact 1/8 as start or excitation signal via the subscriber line loop and contact 1$t$8 the excitation current path $s$8. The lead finder S operates in the manner described already in connection with FIG. 6. In the conversation condition, the catching relay F8 is excited via contact 4$t$8 and resistor W$d$18. In the captive condition, that is when the connection switched through via the switching network has already been released, but the subscriber at the subscriber station T1$n$8 has not yet put down his handset, the relay F8 is excited via its own contact 3/8. The negative potential from the make side of the contact 1/8 reaches the excitation current path $s$8 via contacts 1/8, 1$t$8, the subscriber line loop and contact 2$t$8 and prevents thus for the time being that the ground or earth potential can reach the excitation current path via the resistor W$d$8. This inhibits response of the relay X in the lead finder S according to FIG. 9 already during the captive operating condition.

If the subscriber line loop is opened in the captive condition at the subscriber station T1$n$8, then the above mentioned circuit which has existed up to then via that loop is interrupted. Now the relay X of the lead finder S according to FIG. 9 is made to respond via the resistor W$d$8 and excitation current path $s$8 in the manner already described in connection with FIG. 6. The lead finder S operates in the manner already described and effects dropping of the catching relay F8 through shorting thereof upon stopping of the lead finder. With the aid of the capacitor C8, the post-selection safety in the captive condition is assured for the subscriber connecting circuit shown in FIG. 8. Upon release of the subscriber connecting circuit according to FIG. 8 from the captive condition, the lead finder S according to FIG. 9 distinguishes between the two operating conditions (call condition on the one hand and opening of the subscriber line loop on the other hand) or the basis of the current intensity in the relay Z. After opening of the subscriber line loop in the captive condition, the resistor W$d$8 is in the circuit extending over the excitation current path $s$8 in FIG. 8 and the relays Y and Z in FIG. 9; however, this is not the case in the call condition. The resistance value of this resistor is dimensioned for this purpose so that it amounts to a multiple of the maximum internal resistance of the subscriber line loop.

Figure 7:
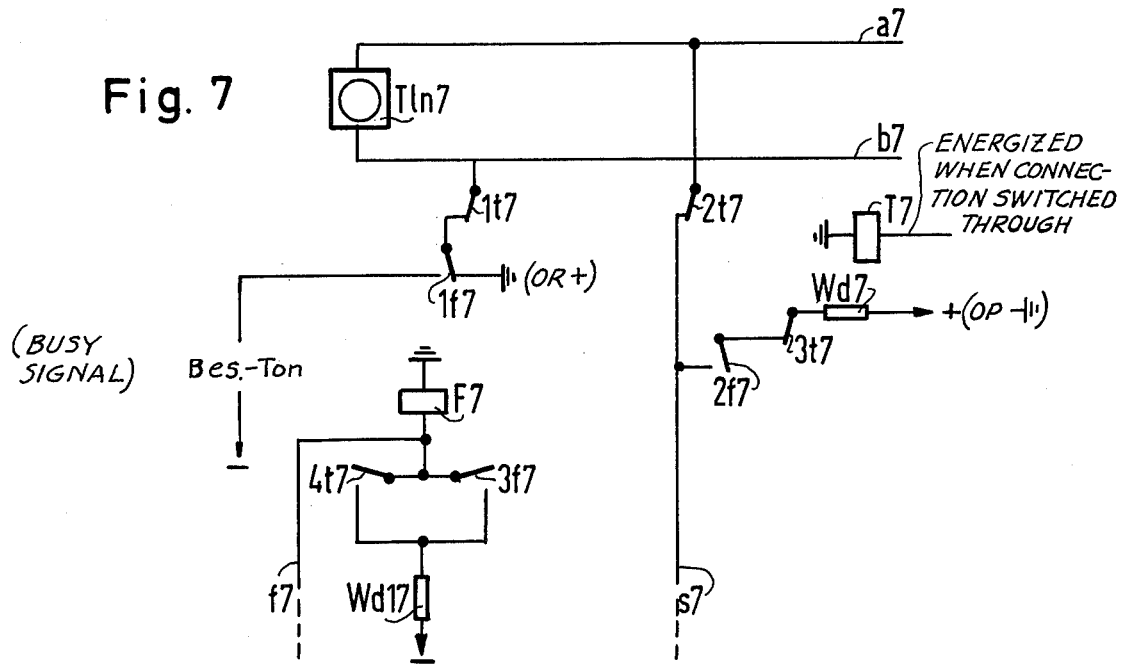

FIG. 7 shows a modification of the circuitry according to FIG. 8. The essential difference resides in the connection of the resisitor W$d$7 to the positive potential, rather than to ground or earth. In the call condition, ground or earth potential is applied via the excitation current path $s$7 to the particular segment contact of the contact segment of the lead finder S as in the circuitry of FIG. 8. On the other hand, a positive potential is applied to the particular segment contact of the lead finder S via the winding of the catching relay F7 or resistor W$d$7, contacts 3$t$7 and 2$f$7 and the excitation current path $s$7, when the subscriber line loop is opened in the captive condition. For a differentiation of these two conditions of operation, a potential differing in these two conditions of operation is placed at the disposition of the lead finder S by the particular subscriber connection circuit in the case of the embodiment of the inventive circuitry according to FIG. 7. In that case, the lead finder S is modified so as to effect a potential measurement after it has stopped at the segment contact corresponding to the particular subscriber connection circuit. If the lead finder circuit thereby detects an application of ground or earth potential, then it issues to the central control a characteristic signal for a through-switching of a connection from the particular subscriber connecting circuit via the switching network to an idle dial signal responsive circuit; on the other hand, if the lead finder circuit S thereby detects a positive potential, then it locks out the catching relay F7 in a manner corresponding to the description of the circuitry according to FIG. 9. In deviation of the circuitry shown in FIG. 7, it is also possible to connect to the break side of the break-and-make contact 1f7 a positive potential instead of the ground or earth potential, and to connect to resistor or winding Wd7 of catching relay F7 a ground or earth potential instead of the positive potential. In that case, the lead finder according to FIG. 9 distinguishes the described two conditions of operation by means of voltage measurements in a manner corresponding to the above description.

Various well-known devices exist for effecting the requisite voltage measurements. In practice, these may advantageously be of a semiconductive type. For instance, as shown in dotted lines in FIG. 9, a control element CE may be combined with the Z-relay, to make sure that the Z-relay only responds in the case of a call condition for issuing a request in conjunction with the Y-relay to the central control ZS, as described above, but that the Z-relay does not respond in the captive condition in order to permit a lockout of the F-relay via timing device Zx if a connection has been released before the subscriber has hung up. The above mentioned alternatives in the application of potentials are shown with and without parentheses in FIGS. 7 and in the dotted portion of FIG. 9. In the parenthetically illustrated alternative, the control element CE may comprise or function in the nature of a PNP transistor. In the electric potential version shown without parentheses, the control element CE may rather comprise or function in the nature of an NPN transistor. In this sense, the control element CE may have a control input ce in the nature of an emitter, a comparison input be in the nature of a base electrode, and an output cc in the nature of a collector.

The subject extensive disclosure renders apparent or suggests various modifications and variations within the spirit and scope of the invention to those skilled in the art.

We claim:

1. In a telecommunication system wherein subscriber stations with line circuits are selectively connected and controlled by an exchange having a central control and have operating conditions varying from an idle to a start condition and from a captive to the idle condition, the improvement comprising in combination:
   means common and connected to the subscriber stations for monitoring the subscriber stations for a transfer from the idle to the start condition and for a transfer from the captive to the idle condition;
   means for each subscriber station for generating starting signals in response to a variation from an idle to a start condition and in response to a variation from a captive to the idle condition of the particular subscriber station;
   means connected to said starting signal generating means and to said common monitoring means for starting in response to each starting signal said monitoring of the subscriber stations by the common monitoring means;
   means common to the subscriber stations and connected to the monitoring means for issuing a request to the central control for the establishment of a connection for a subscriber station for which a transfer from the idle to the start condition has been ascertained; and
   means common to the subscriber stations and connected to the monitoring means for releasing from the captive condition a subscriber station for which a transfer from the captive to the idle condition has been ascertained.

2. A system as claimed in claim 1, wherein:
   said monitoring means include means for scanning the subscriber stations in groups; and
   said starting means include means for starting said scanning means in response to each starting signal.

3. A system as claimed in claim 1, wherein:
   said monitoring means include means for scanning the subscriber stations in groups and for scanning subscriber stations in a group individually until the subscriber station causing a particular transfer has been ascertained; and
   said starting means include means for starting said scanning means in response to each starting signal.

4. A system as claimed in claim 1, wherein:
   said monitoring means include means for scanning the subscriber station in groups, in subgroups and individually until the subscriber station causing the particular transfer has been ascertained; and
   said starting means include means for starting said scanning means in response to each starting signal.

5. In a telecommunication system wherein subscriber stations with line circuits are selectively connected and controlled by an exchange having a central control and have operating conditions varying from an idle to a start condition and from a captive to the idle condition, the improvement comprising in combination:
   means connected to said subscriber stations for issuing a signal of a first type indicative of a transfer of any subscriber station from the idle to the start condition and a signal of a second type indicative of a transfer of any subscriber station from the captive to the idle condition;
   means connected to said signal issuing means for ascertaining the particular subscriber station for which one of said signals of said first and second types has been issued;
   means connected to said signal issuing means and to said ascertaining means for starting in response to each signal of a first type and each signal of a second type said ascertaining of the subscriber station;
   means connected to the ascertaining means for issuing a request to the central control for the establishment of a connection for the ascertained subscriber station in response to a signal of the first type; and
   means connected to the ascertaining means for carrying out a release of the ascertained subscriber station from the captive condition in response to a signal of the second type.

6. A system as claimed in claim 5, wherein:
   said ascertaining means include means for scanning the subscriber stations in groups; and
   said starting means include means for starting said scanning means in response to each signal of a first type and each signal of a second type.

7. A system as claimed in claim 5, wherein:
   said ascertaining means include means for scanning the subscriber stations in groups and for scanning subscriber stations in a group individually until the subscriber station causing a particular transfer has been ascertained; and said starting means include means for starting said scanning means in response to each signal of a first type and each signal of a second type.

8. A system as claimed in claim 5, wherein:
said ascertaining means include means for scanning the subscriber station in groups, in subgroups and individually until the subscriber station causing the particular transfer has been ascertained; and
said starting means include means for starting said scanning means in response to each signal of a first type and each signal of a second type.

9. A system as claimed in claim 5, wherein:
the subscriber stations are divided into subscriber station groups; and
said ascertaining means include means for individually interrogating each subscriber station group as to issuance of a signal of one of said first and second types.

10. A system as claimed in claim 5, wherein:
the subscriber stations are divided into subscriber station groups and each subscriber station group is subdivided into subscriber station subgroups; and
said ascertaining means include means for individually interrogating each subscriber station group as to issuance of a signal of said first and second types, and means for further interrogating each subgroup of any group from which one of said signals has issued.

11. A system as claimed in claim 5, wherein:
said signal issuing means include for said subscriber stations individual excitation leads, and means for selectively energizing the excitation leads with signals of said first type and signals of said second type; and
said ascertaining means include means for interrogating the excitation leads.

12. A system as claimed in claim 11, wherein:
said ascertaining means include means for jointly interrogating several excitation leads at a time.

13. A system as claimed in claim 5, wherein:
each of said subscriber stations has a line circuit, a cradle, a handset on the cradle, and a cradle switch for maintaining the line circuit open as long as the handset is on the cradle, and for closing the line circuit when the handset is removed from the cradle; and
said signal issuing means include for each subscriber station first and second excitation leads, means for energizing the first excitation lead in response to a removal of the handset of the particular subscriber station from its cradle, means for energizing the second excitation lead in response to a replacement of the handset on its cradle after a release of a connection including the particular subscriber station, and means for issuing a signal of said first type upon energization of the first excitation lead and for issuing a signal of said second type upon energization of the second excitation lead.

14. A system as claimed in claim 5, wherein:
said subscriber stations have subscriber line loops; and
said signal issuing means include for each subscriber station first and second excitation leads, means for energizing the first excitation lead in response to a closure of the subscriber line loop of the particular subscriber station, means for energizing the second excitation lead in response to an opening of the subscriber line loop after a release of a connection including the particular subscriber station, and means for issuing a signal of said first type upon energization of the first excitation lead and for issuing a signal of said second type upon energization of the second excitation lead.

15. A system as claimed in claim 5, wherein:
said ascertaining means include monitoring circuits which are common for said transfer from the idle to the start condition and said transfer from the captive to the idle condition, and which individually lead to the signal issuing means for signals of said first type and for signals of said second type.

16. A system as claimed in claim 5, wherein:
said signal issuing means include means for preparatorily providing a start signal for said ascertaining means and for selectively suppressing said start signal.

17. A system as claimed in claim 5, wherein:
said signal issuing means include for each subscriber station an excitation lead for conducting said signals of said first and second types; and
said ascertaining means include means connected to said excitation lead for distinguishing signals of said first type and signals of said second type from each other.

18. A system as claimed in claim 5, wherein:
said ascertaining means include means for scanning said signal issuing means, means connected to said signal issuing means for starting said scanning means in response to a signal of either of said first and second types, means connected to said scanning means for issuing a request to the central control for the establishment of said connection, and means connected to said scanning means for carrying out said release from the captive condition.

19. A system as claimed in claim 18, wherein:
each line circuit includes relay means and means for energizing said relay means for each subscriber station during a conversation; and
said means for carrying out said release include means connected to said line circuit for locking out said relay means for each subscriber station transferring from a captive condition to the idle condition.

20. A system as claimed in claim 19, wherein: said locking out means include timing means.

21. A system as claimed in claim 18, wherein:
said subscriber stations include subscriber line loops and means for issuing dialing pulses over said subscriber line loops; and
said starting means include means for delaying a start of said scanning means upon interruption of a subscriber line loop in the captive condition for a period of time larger than said dialing pulses to render the system post-selection proof.

22. A system as claimed in claim 18, wherein:
said subscriber stations include subscriber line loops; and
said line circuits include means for suppressing a start of said scanning means in the captive condition until an opening of an associated subscriber line loop.

23. In a telecommunication system wherein subscriber stations with line circuits are selectively connected and controlled by an exchange having a central control and have operating conditions varying from an idle to a start condition and from a captive to the idle condition, the improvement comprising in combination:

means connected to said subscriber stations for issuing a signal indicative of a transfer of any subscriber station from the captive to the idle condition;

means common to said subscriber stations for monitoring said subscriber stations as to the issuance of a signal indicative of a transfer of a subscriber station from the captive to the idle condition;

means common to said subscriber stations and connected to said signal issuing means and to said monitoring means for ascertaining the particular subscriber station for which said indicative signal has been issued and for carrying out a release of the particular captive condition; and means connected to said signal issuing means for starting in response to said indicative signal said ascertaining means.

24. A system as claimed in claim 23, wherein:
said ascertaining means include means for scanning the subscriber stations in groups; and
said starting means include means for starting said scanning means in response to said indicative signal.

25. A system as claimed in claim 23, wherein:
said ascertaining means include means for scanning the subscriber stations in groups and for scanning subscriber stations in a group individually until the subscriber station causing a particular transfer has been ascertained; and
said starting means include means for starting said scanning means in response to said indicative signal.

26. A system as claimed in claim 23, wherein:
said ascertaining means include means for scanning the subscriber station in groups, in subgroups and individually until the subscriber station causing the particular transfer has been ascertained; and
said starting means include means for starting said scanning means in response to said indicative signal.

27. A system as claimed in claim 23, wherein:
said signal issuing means include for said subscriber stations individual excitation leads, and means for selectively energizing the excitation leads with said indicative signal; and
said ascertaining means include means for interrogating the excitation leads.

28. A system as claimed in claim 27, wherein:
said ascertaining means include means for jointly interrogating several excitation leads at a time.

29. A system as claimed in claim 23, wherein:
said signal issuing means include means for preparatorily providing a start signal for said ascertaining means and for selectively suppressing said start signal.

30. In a telecommunication system wherein subscriber stations with line circuits are selectively connected and controlled by an exchange having a central control and have operating conditions varying from an idle to a start condition and from a captive to the idle condition, the improvement comprising in combination:

means for subdividing the subscriber stations into subscriber groups and the subscriber groups into subscriber subgroups;

means connected to the line circuit of each subscriber station and including a lead for indicating a subscriber station transition from the captive to the idle condition;

means connected to said lead for jointly interrogating the leads of each subscriber group and for individually interrogating the leads of each subscriber subgroup of any subscriber group wherein a transition indication has occurred; and means connected to the interrogating means for providing for each subscriber station as to which a transition indication has occurred a cancellation of a captive condition;

means for each subscriber station for generating starting signals in response to a variation from an idle to a start condition and in response to a variation from a captive to the idle condition of the particular subscriber station; and means connected to said starting signal generating means for starting in response to each starting signal said interrogating means.

31. In a telecommunication system wherein subscriber stations with line circuits are selectively connected and controlled by an exchange having a central control and have operating conditions varying from an idle to a start condition and from a captive to the idle condition, the improvement comprising in combination:

means for subdividing the subscriber stations into subscriber groups and the subscriber groups into subscriber subgroups;

means connected to the line circuit of each subscriber station and including a lead of a first type for indicating a subscriber station transition from the idle to the start condition and a lead of a second type for indicating a subscriber station transition from the captive to the idle condition;

means connected to the leads of the first and second types for jointly interrogating the leads of the same type of each subscriber group and for individually interrogating the leads of the same type of each subscriber subgroup of any subscriber group wherein a transition indication has occurred;

means connected to the interrogating means for providing for each subscriber station as to which a transition indication has occurred selectively a request to the central control and a cancellation of a captive condition, respectively, depending on the type of transition indication;

means for each subscriber station for generating starting signals in response to a variation from an idle to a start condition and in response to a variation from a captive to the idle condition of the particular subscriber station; and means connected to said starting signal generating means for starting in response to each starting signal said interrogating means.

* * * * *